(12) United States Patent
Schomisch et al.

(10) Patent No.: US 10,663,685 B2
(45) Date of Patent: May 26, 2020

(54) FIBER OPTIC CABLE PACKAGING ARRANGEMENT

(71) Applicant: CommScope Technologies LLC, Hickory, NC (US)

(72) Inventors: Michael J. Schomisch, Rosemount, MN (US); Dennis Ray Wells, Richfield, MN (US); Scott C. Kowalczyk, Savage, MN (US); Mark Hodapp, Belle Plaine, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/108,706

(22) Filed: Aug. 22, 2018

(65) Prior Publication Data

US 2019/0064466 A1 Feb. 28, 2019

Related U.S. Application Data

(63) Continuation of application No. 15/677,481, filed on Aug. 15, 2017, now Pat. No. 10,078,193, which is a
(Continued)

(51) Int. Cl.
*G02B 6/44* (2006.01)
*G02B 6/38* (2006.01)

(52) U.S. Cl.
CPC ......... *G02B 6/4457* (2013.01); *G02B 6/3897* (2013.01); *G02B 6/4446* (2013.01);
(Continued)

(58) Field of Classification Search
CPC .. G02B 6/4457; G02B 6/3897; G02B 6/4446; G02B 6/4452; G02B 6/4471;
(Continued)

(56) References Cited

U.S. PATENT DOCUMENTS 1,558,345 A 10/1925 De Lin
2,205,056 A 6/1940 Atkins
(Continued)

FOREIGN PATENT DOCUMENTS

CA 2 047 652 A1 1/1993
JP 59-028117 A 2/1984
(Continued)

OTHER PUBLICATIONS

International Search Report and Written Opinion for International Application No. PCT/US2013/027997 dated Jun. 26, 2013, 12 pages.
(Continued)

*Primary Examiner* — Peter Radkowski
(74) *Attorney, Agent, or Firm* — Merchant & Gould P.C.

(57) ABSTRACT

A fiber optic enclosure assembly is disclosed herein. The assembly includes a fiber optic enclosure defining connection locations, a fiber optic cable extending from the connection locations of the fiber optic enclosure, and a covering defining a first axial end and a second axial end, the covering defining a throughhole extending from the first axial end to the second axial end, the throughhole extending along a central longitudinal axis of the covering, the covering defining a first cavity for receiving the fiber optic enclosure. A port extends from the first cavity to an outer surface of the covering, wherein the fiber optic cable extending from the connection locations can extend from the first cavity to the outer surface of the covering for wrapping around the outer surface of the covering.

13 Claims, 9 Drawing Sheets

Related U.S. Application Data continuation of application No. 15/273,803, filed on Sep. 23, 2016, now Pat. No. 9,791,655, which is a continuation of application No. 14/381,907, filed as application No. PCT/US2013/027997 on Feb. 27, 2013, now Pat. No. 9,494,757.

(60) Provisional application No. 61/604,991, filed on Feb. 29, 2012.

(52) U.S. Cl.
CPC ......... *G02B 6/4452* (2013.01); *G02B 6/4471* (2013.01); *G02B 6/4479* (2013.01); *G02B 6/4466* (2013.01); *Y10T 29/49815* (2015.01); *Y10T 29/49826* (2015.01)

(58) Field of Classification Search
CPC ................ G02B 6/4479; G02B 6/4466; Y10T 29/49815; Y10T 29/49826
See application file for complete search history.

(56) References Cited

U.S. PATENT DOCUMENTS

| | | | |
|---|---|---|---|
| 2,856,470 A | 10/1958 | Hyde | |
| 3,208,121 A | 9/1965 | Price | |
| 3,837,448 A | 9/1974 | Hagstrom | |
| 4,338,497 A | 7/1982 | Drew | |
| 4,467,979 A * | 8/1984 | Koehler | B65H 75/40 191/12.4 |
| 4,520,239 A | 5/1985 | Schwartz | |
| 4,656,320 A | 4/1987 | Maddock | |
| 4,657,140 A * | 4/1987 | Zagar | B65H 75/14 206/397 |
| 4,667,896 A | 5/1987 | Frey et al. | |
| 4,796,830 A * | 1/1989 | Gelfman | B65H 75/18 242/118.4 |
| 5,317,663 A | 5/1994 | Beard et al. | |
| 5,497,444 A | 3/1996 | Wheeler | |
| 5,717,810 A | 2/1998 | Wheeler | |
| 5,957,401 A | 9/1999 | O'Donnell | |
| 6,215,938 B1 | 4/2001 | Reitmeier et al. | |
| 6,223,871 B1 * | 5/2001 | Steffen | H02G 11/02 191/12 R |
| 6,253,893 B1 | 7/2001 | Chi-Min | |
| 6,480,660 B1 | 11/2002 | Reitmeier et al. | |
| 6,591,051 B2 | 7/2003 | Solheid et al. | |
| 6,616,080 B1 | 9/2003 | Edwards et al. | |
| 6,669,135 B1 | 12/2003 | Hartley | |
| 6,809,258 B1 | 10/2004 | Dang et al. | |
| 6,814,232 B1 | 11/2004 | Morris et al. | |
| 7,400,814 B1 | 7/2008 | Hendrickson et al. | |
| 7,438,258 B2 | 10/2008 | Chen | |
| 7,522,806 B2 | 4/2009 | Hendrickson et al. | |
| 7,546,018 B2 | 6/2009 | Hendrickson et al. | |
| 7,715,679 B2 | 5/2010 | Kowalczyk et al. | |
| 7,748,660 B2 | 7/2010 | Hendrickson et al. | |
| 7,869,682 B2 | 1/2011 | Kowalczyk et al. | |
| 7,874,411 B2 | 1/2011 | Roberts et al. | |
| 7,945,138 B2 | 5/2011 | Hill et al. | |
| 8,074,916 B2 | 12/2011 | Penumatcha et al. | |
| 8,265,447 B2 | 3/2012 | Kowalczyk et al. | |
| 8,254,740 B2 | 8/2012 | Smith et al. | |
| 8,380,035 B2 | 2/2013 | Kowalczyk et al. | |
| 8,422,847 B2 | 4/2013 | Kowalczyk et al. | |
| 8,480,023 B2 | 7/2013 | Penumatcha et al. | |
| 8,565,572 B2 | 10/2013 | Krampotich et al. | |
| 8,805,152 B2 | 8/2014 | Smith et al. | |
| RE45,153 E | 9/2014 | Hendrickson et al. | |
| 8,938,147 B2 | 1/2015 | Krampotich et al. | |
| 9,042,699 B2 | 5/2015 | Barry et al. | |
| 9,042,700 B2 | 5/2015 | Smith et al. | |
| 9,097,870 B2 | 8/2015 | Torman et al. | |
| 9,170,392 B2 | 10/2015 | Krampotich et al. | |
| 9,377,597 B2 | 6/2016 | Barry et al. | |
| 2004/0232275 A1 | 11/2004 | Vogel et al. | |
| 2006/0138269 A1 | 6/2006 | Renzoni | |
| 2007/0025675 A1 | 2/2007 | Kramer | |
| 2007/0176045 A1 | 8/2007 | Chen | |
| 2008/0093187 A1 | 4/2008 | Roberts et al. | |
| 2008/0292261 A1 | 11/2008 | Kowalczyk et al. | |
| 2009/0074370 A1* | 3/2009 | Kowalczyk | G02B 6/4441 385/135 |
| 2009/0230228 A1 | 9/2009 | Penumatcha et al. | |
| 2010/0142910 A1 | 6/2010 | Hill et al. | |
| 2010/0247051 A1 | 9/2010 | Kowalczyk et al. | |
| 2011/0262146 A1 | 10/2011 | Khemakhem et al. | |
| 2011/0299266 A1 | 12/2011 | Barry et al. | |
| 2011/0299822 A1 | 12/2011 | Barry et al. | |
| 2012/0145821 A1 | 6/2012 | Penumatcha et al. | |
| 2012/0251053 A1 | 10/2012 | Kowalczyk et al. | |
| 2013/0170811 A1 | 7/2013 | Kowalczyk et al. | |
| 2014/0334791 A1 | 11/2014 | Smith et al. | |
| 2015/0063770 A1 | 3/2015 | Kowalczyk et al. | |
| 2015/0329312 A1 | 11/2015 | Smith et al. | |
| 2015/0370028 A1 | 12/2015 | Barry et al. | |
| 2016/0062069 A1 | 3/2016 | Krampotich et al. | |

FOREIGN PATENT DOCUMENTS

| | | |
|---|---|---|
| JP | 2000-247547 A | 9/2000 |
| JP | 2007-031115 A | 2/2007 |
| WO | 2013/039783 A2 | 3/2013 |

OTHER PUBLICATIONS

ADC Telecommunications Inc., Catalog, Fiber Panel Products, Second Edition, front cover, pp. 21, 36, 42, 44, 49, 51, 56 and back cover, Jul. 1996.

ADC Telecommunications Inc., Catalog, Fiber Cable Management Products, Third Edition, fron cover, pp. 4, 24, 32, 117 and back cover, Jun. 1998.

ADC Telecommunications' Next Generation Fram (NGF) Product Family Ordering Guide, "Next Generation Frames—Fiber Termination Blocks," Oct. 1998, 2 pages.

"Description of Admitted Prior Art" including Exhibit 1, ADC Telecommunications, Oct. 1995, 30 pages.

Drawing of an ADC Telecommunications Inc., Panel Product on a Spool, 900FT Spool Assy, 1 page (Admitted as Prior Art as of Feb. 29, 2011.

"Fiber Panel Products, Second Edition," ADC Telecommunications, Jul. 1996, 117 pages.

"Fiber Cable Management Products, Third Edition," ADC Telecommunications, Jun. 1998, 142 pages.

"FTTx, "V" Vlinx EZ-Spool Combiner," ofs a Furuka ofs a Furukawa Company, 2007, 2 pages.

"FTTx, "V" Vlinx EZ-Spool Terminal," ofs a Furuka ofs a Furukawa Company, 2007, 2 pages.

"Value-Added Module System," ADC Telecommunications, Jun. 1998, 4 pages.

* cited by examiner

FIBER OPTIC CABLE PACKAGING ARRANGEMENT

This application is a Continuation of U.S. patent application Ser. No. 15/677,481, filed on 15 Aug. 2017, now U.S. Pat. No. 10,078,193, issued on 18 Sep. 2018, which is a Continuation of U.S. patent application Ser. No. 15/273,803, filed on 23 Sep. 2016, now U.S. Pat. No. 9,791,655, issued on 17 Oct. 2017, which is a Continuation of U.S. patent application Ser. No. 14/381,907, filed on 28 Aug. 2014, now U.S. Pat. No. 9,494,757, issued on 15 Nov. 2016, which is a U.S. National Stage of PCT International Patent Application No. PCT/US2013/027997, filed on 27 Feb. 2013, which claims priority to U.S. Patent Application Ser. No. 61/604,991 filed on 29 Feb. 2012, the disclosures of which are incorporated herein by reference in their entireties.

TECHNICAL FIELD

The present disclosure relates to fiber optic enclosure assemblies. More specifically, the present disclosure relates to packaging arrangements for fiber optic enclosure assemblies.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

An aspect of the present disclosure relates to a fiber optic enclosure assembly. The assembly includes a fiber optic enclosure defining connection locations, a fiber optic cable extending from the connection locations of the fiber optic enclosure, and a covering defining a first axial end and a second axial end, the covering defining a throughhole extending from the first axial end to the second axial end, the throughhole extending along a central longitudinal axis of the covering, the covering defining a first cavity for receiving the fiber optic enclosure. A port extends from the first cavity to an outer surface of the covering, wherein the fiber optic cable extending from the connection locations can extend from the first cavity to the outer surface of the covering for wrapping around the outer surface of the covering.

Another aspect of the present disclosure relates to a method of packaging a fiber optic enclosure having connection locations for storage or shipping, the method comprising providing a covering defining a first axial end and a second axial end, the covering defining a throughhole extending from the first axial end to the second axial end, the throughhole extending along a central longitudinal axis of the covering, the covering defining a first cavity for receiving the fiber optic enclosure, inserting the fiber optic enclosure into the first cavity, extending a fiber optic cable from the connection locations of the fiber optic enclosure to an outer surface of the covering, and wrapping the fiber optic cable around the outer surface of the covering.

A further aspect of the present disclosure relates to a method of deploying fiber optic cable from a fiber optic enclosure assembly, the method comprising providing a covering for housing a fiber optic enclosure, the covering defining a first axial end and a second axial end, the covering defining a throughhole extending from the first axial end to the second axial end, the throughhole extending along a central longitudinal axis of the covering, rotating the covering about the central longitudinal axis using the throughhole of the covering in deploying fiber optic cable from an outer surface of the covering, after fiber optic cable wrapped around the covering has been deployed, removing the fiber optic enclosure from the covering.

A further aspect of the present disclosure relates to a covering for packaging a fiber optic enclosure for storage or shipment, the covering comprising a first axial end, a second axial end, and an outer surface defined therebetween, a throughhole extending from the first axial end to the second axial end, the throughhole extending along a central longitudinal axis of the covering, a cavity configured for receiving the fiber optic enclosure, and a port extending from the cavity to the outer surface of the covering, the port configured to accommodate a fiber optic cable extending from a fiber optic enclosure placed within the cavity to the outer surface of the covering.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
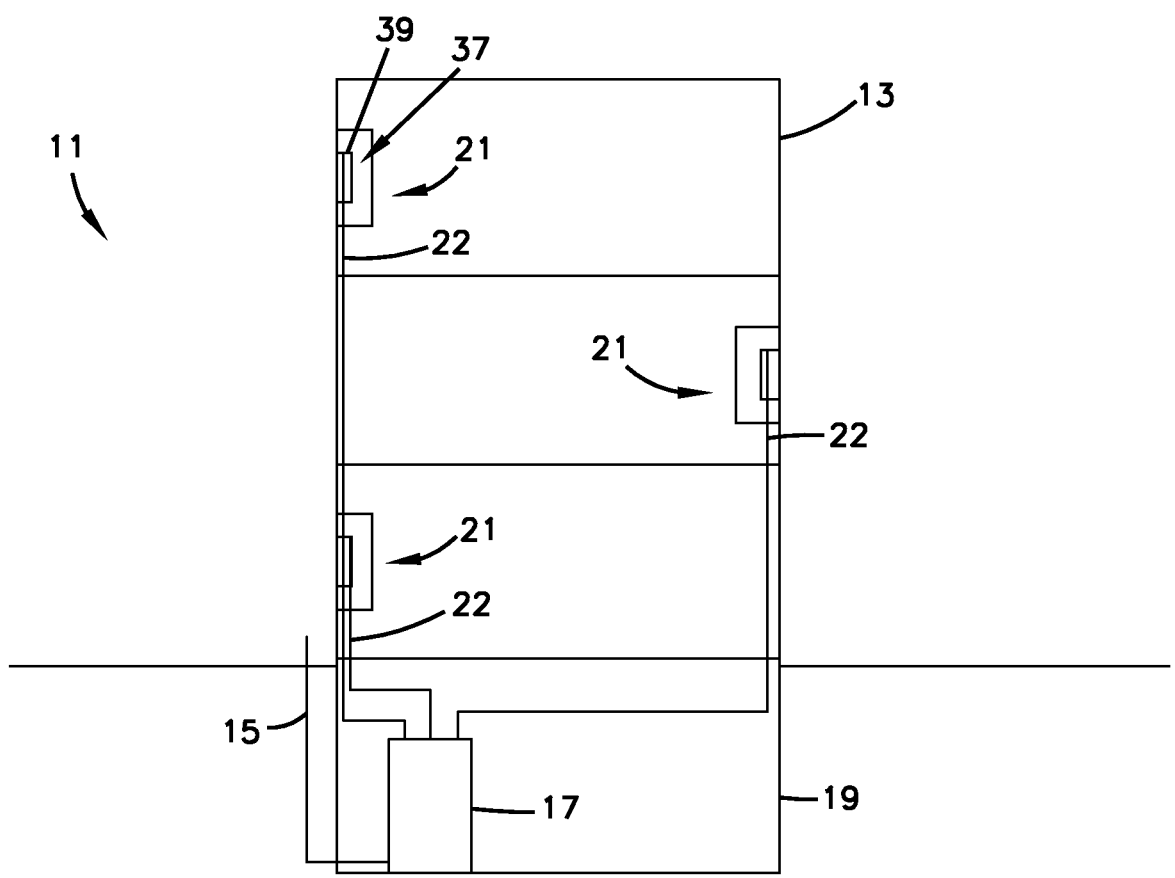
FIG. 1 is a schematic representation of an embodiment of a fiber optic network that includes a fiber distribution hub that receives a feeder cable from a central office and a number of fiber optic enclosures that receive subscriber cables from the distribution hub.

Referring now to FIG. 1, a schematic representation of a fiber optic network, generally designated 11, in a facility 13 (e.g., individual residence, apartment, condominium, business, etc.) is shown. The fiber optic network 11 includes a feeder cable 15 from a central office (not shown). The feeder cable 15 enters a feeder cable input location 17 (e.g., a fiber distribution hub, a network interface device, etc.) having one or more optical splitters (e.g., 1-to-8 splitters, 1-to-16 splitters, or 1-to-32 splitters) that generate a number of individual fibers. In the subject embodiment, and by way of example only, the fiber distribution hub 17 is located on a lower level 19 of the facility 13. Each unit in the facility 13 includes a fiber optic enclosure, generally designated 21, with a subscriber cable 22 extending from each of the fiber optic enclosures 21 to the fiber distribution hub 17. The subscriber cable 22 extending between the fiber distribution hub 17 and the fiber optic enclosure 21 typically includes multiple optical fibers.

Figure 13:
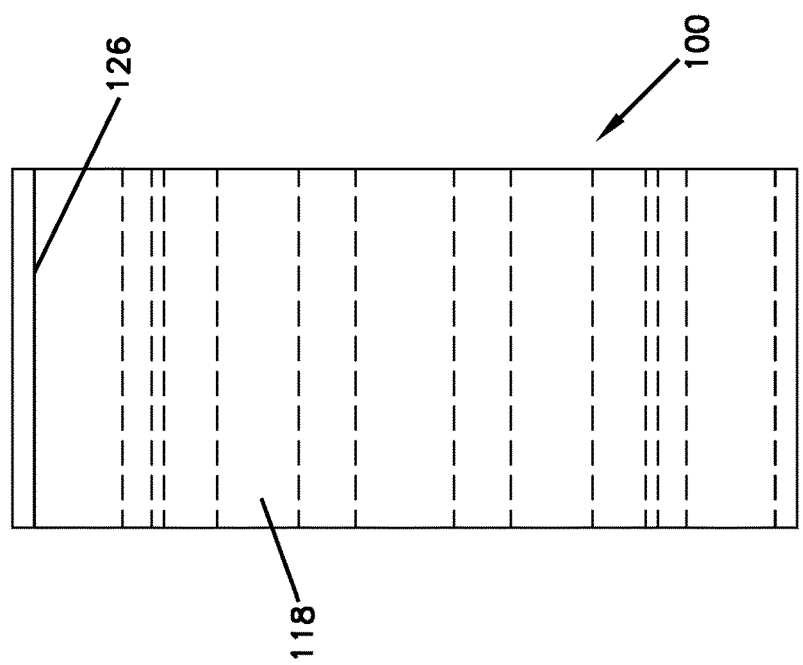
FIG. 13 is a side view of the core of the covering of FIG. 12 shown without the flanges.
Figure 12:
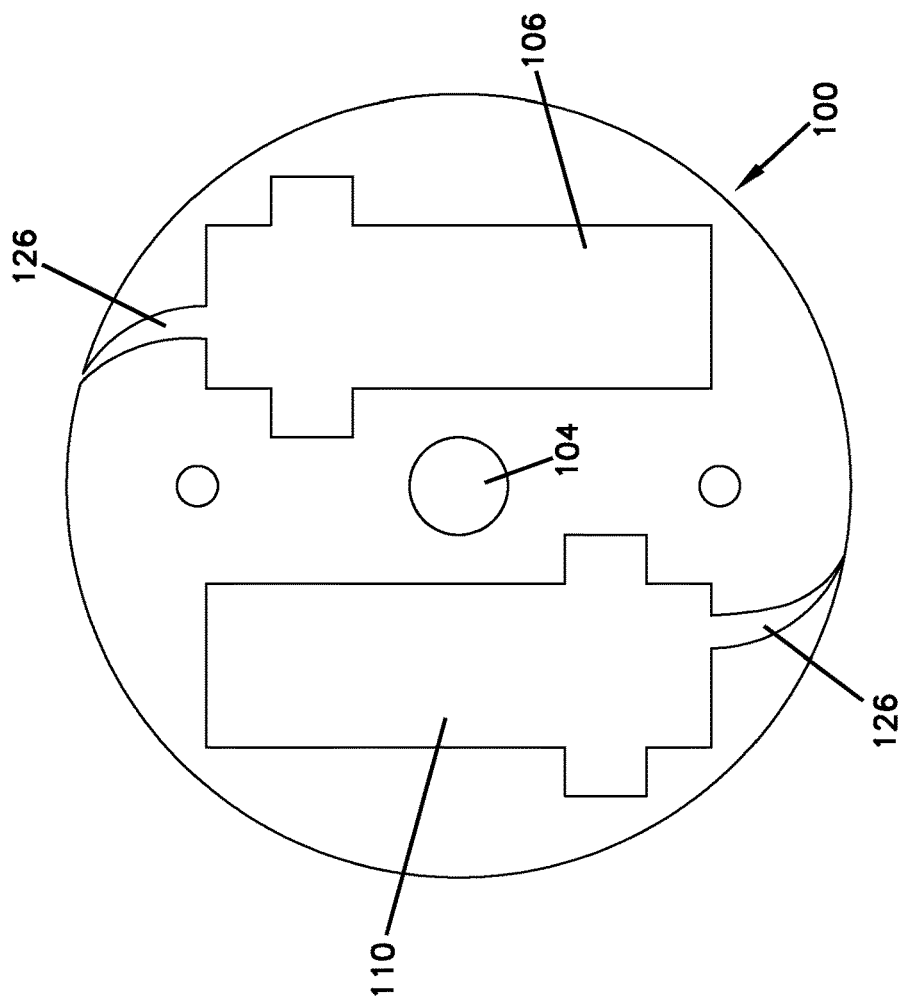
FIG. 12 illustrates the core of the covering of FIGS. 10-11 without the flanges.
Figure 15:
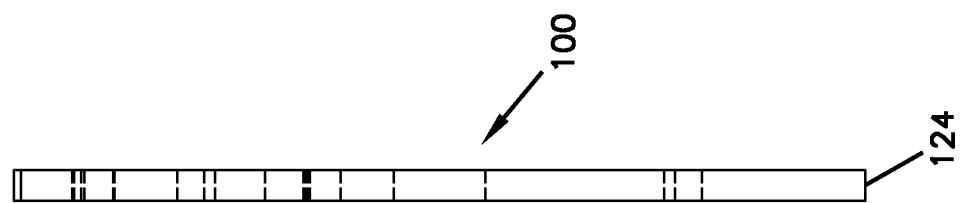
FIG. 15 is a side view of the portion of the covering defining one of the flanges of the covering.
Figure 14:
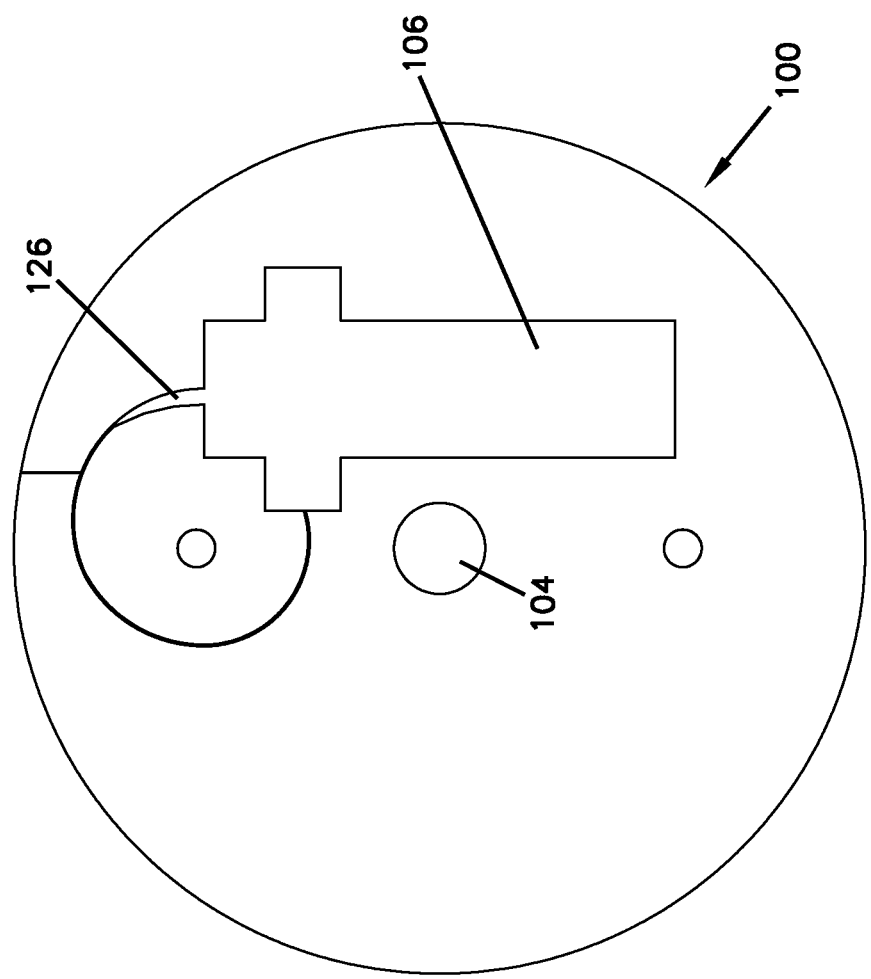
FIG. 14 is a top view of a portion of the covering defining one of the flanges of the covering.

Referring now to FIGS. 2-7, an example implementation of a fiber optic enclosure assembly 10 that includes the fiber optic enclosure 21 and a covering 100 into which the fiber optic enclosure 21 is inserted will now be described. As will be described in further below, the covering 100 (i.e., a container) is configured to protect the enclosure 21 (e.g., during storage or shipping). The covering 100 also defines a cable management recess 102 (e.g., a storage channel) at which additional length of subscriber cable 22 extending from the enclosure 21 may be stored. Thus, the covering 100 not only acts as protective packaging for the enclosure 21 during shipping or storage, but also provides a way to store or hold additional cabling 22 extending from the enclosure 21 at a location outside the enclosure 21, where it can be paid out conveniently during network connection. The covering 100 is shown in isolation in FIGS. 10-15. In FIGS. 12-13, a core portion of the covering 100 is shown. In FIGS. 14-15, a portion of the covering that forms one of the side flanges of the covering is shown is isolation, separated from the core.

Figure 8:
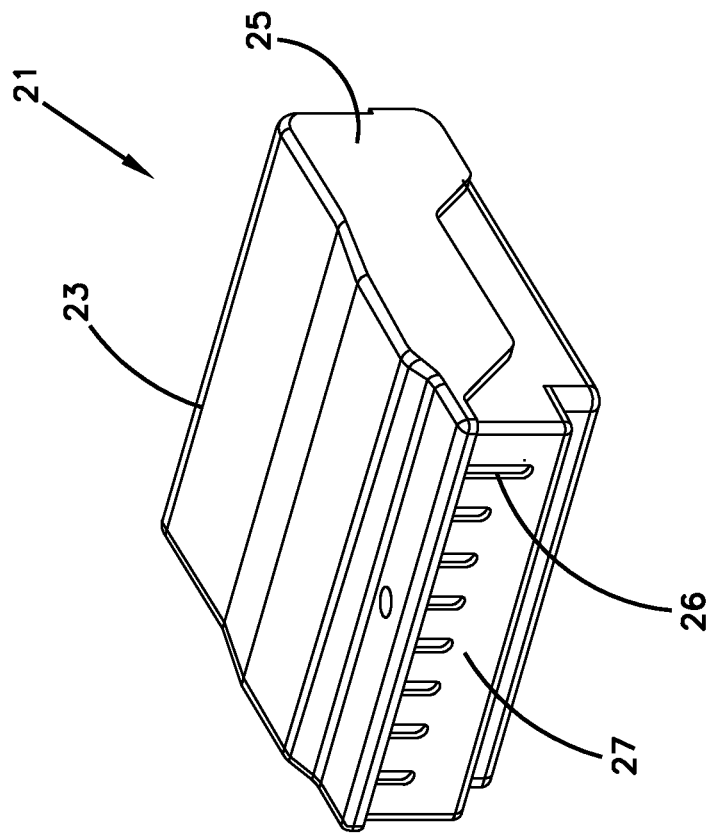
FIG. 8 is a perspective view of one of the fiber optic enclosures of FIG. 1, shown in isolation.
Figure 9:
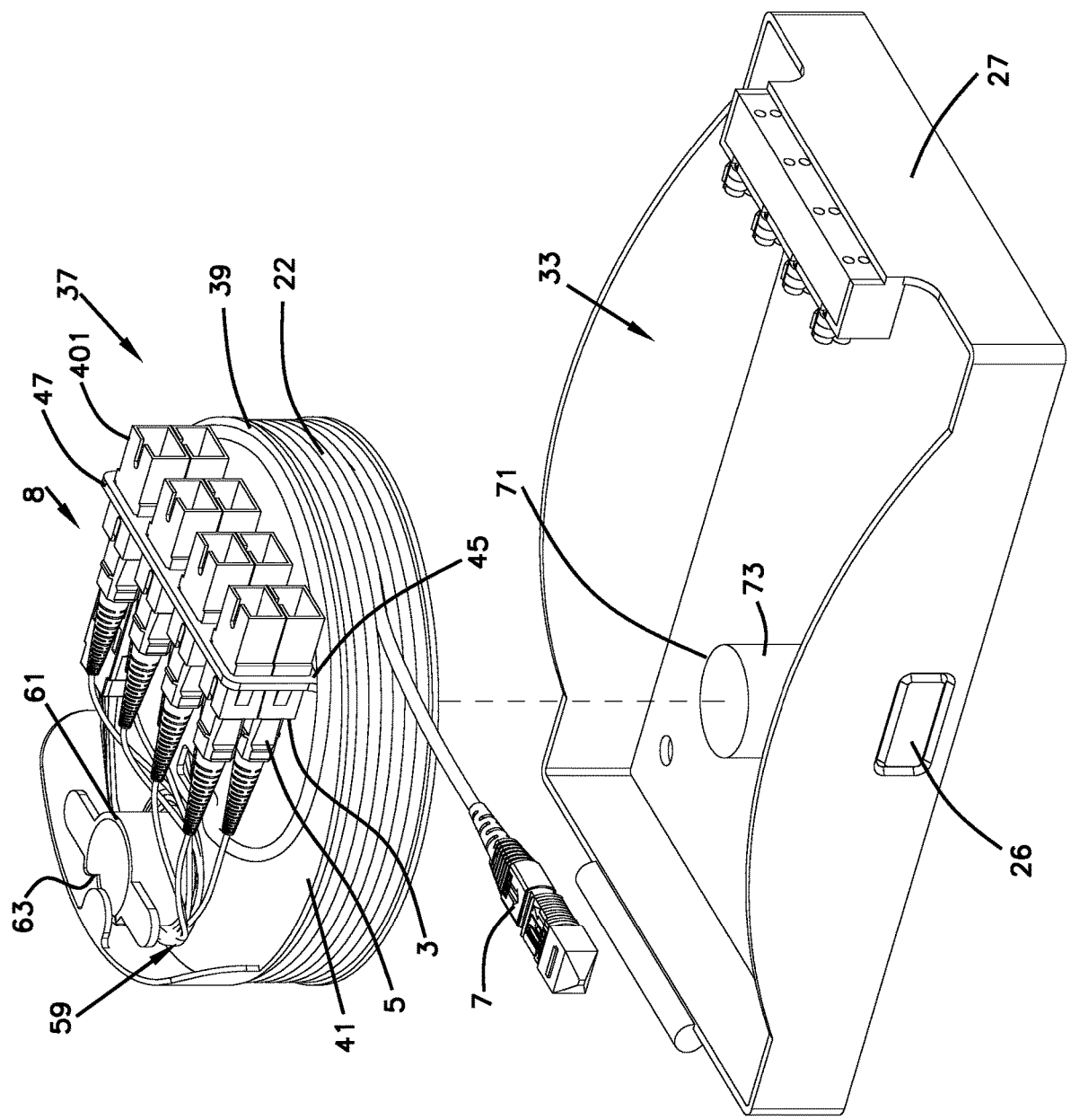
FIG. 9 illustrates an exploded view of the fiber optic enclosure of FIG. 8 with the top removed to illustrate the interior features thereof.
Figure 11:
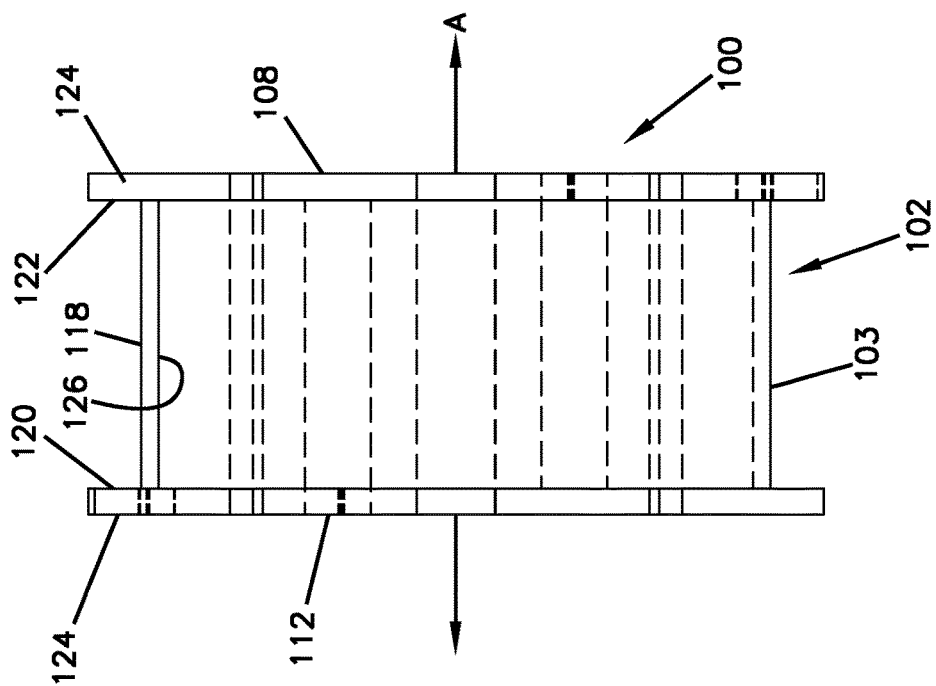
FIG. 11 is a side view of the covering of FIG. 10.

Referring now to FIGS. 8 and 9, the fiber optic enclosure 21 of the fiber optic enclosure assembly 10 is shown. The fiber optic enclosure 21 in general defines a housing 23. A rotatable spool, generally designed 37, is provided within the housing 23. As will be described in further detail below, the rotatable spool 37 may be used for storing and deploying subscriber cabling 22 that is in addition to the cabling around the covering 100.

Still referring to FIGS. 8 and 9, the housing 23 defines an interior region 33. In the subject embodiment, the housing 23 includes a top (i.e., lid) 25 hingedly engaged with a base 27. It will be understood, however, that the scope of the present disclosure is not limited to the top 25 being hingedly engaged the base 27 and the top 25 may be coupled by other means. The housing 23 includes a housing port 26 that extends through the housing 23 to the interior region 33. The housing port 26 is sufficiently large enough to allow at least one fiber optic cable (e.g., subscriber cable 22) to pass from the interior of the housing 23 to the exterior of the housing 23.

A cable distribution system 8 is disposed in the interior region 33 of the housing 23, as illustrated in FIG. 9. The cable distribution system 8 may include any suitable device or assembly of device that allows for rapid distribution of a length of the subscriber cable 22 stored within the housing 23. In some embodiments, the housing 23 and the cable distribution system 8 form a rapid distribution wall box. Embodiments of cable distribution systems have been described in detail in commonly owned U.S. Pat. Nos. 7,756,379 and 7,894,708 and U.S. Pat. Pub. No. 2011/0158599, the disclosures of which are incorporated herein in their entirety by reference.

In the illustrated embodiment, the cable distribution system 8 includes the cable spool 37. The cable spool 37 is disposed in the interior region 33 of the housing 23. The cable spool 37 includes a spooling portion 39, around which the subscriber cable 22 is coiled (shown in FIG. 9). The cable spool 37 has an axial end 41. In the subject embodiment, a termination area is located at the axial end 41 of the cable spool 37. Disposed at the termination area is a termination module, generally designated 45. The termination module 45 of the fiber optic enclosure 21 serves as the dividing line between the incoming fibers and the outgoing fibers.

In certain embodiments, the termination module 45 includes an adapter plate 47. In the subject embodiment, the adapter plate 47 is depicted as an L-shaped bracket. The adapter plate 47 defines one or more adapter slots at which one or more adapters may be coupled to the plate 47. It will be understood, however, that the scope of the present disclosure is not limited to the adapter plate 47 being an L-shaped bracket. A first side of the adapter plate 47 is rigidly mounted (i.e., non-rotatable) to the axial end 41 of the cable spool 37 through a plurality of fasteners (e.g., bolts, screws, rivets, etc.) which are inserted through mounting holes in the first side and in connected engagement with the axial end 41 of the cable spool 37.

The adapter slots of the adapter plate 47 are adapted to receive a plurality of adapters, generally designated 401. In the subject embodiment, the adapters 401 are SC-type adapters 401, although it will be understood that the scope of the present disclosure is not limited to the use of SC-type adapters 401 and other types of adapters may be used. Similar SC-type adapters 401 have been described in detail in commonly owned U.S. Pat. No. 5,317,663, the disclosure of which is incorporated herein by reference.

In an alternate embodiment, instead of fixed adapters 401, the termination module 45 may include a plurality of sliding adapter modules. Similar sliding adapter modules have been described in detail in commonly owned U.S. Pat. Nos. 5,497,444, 5,717,810, 6,591,051 and U.S. Pat. Pub. No. 2007/0025675, the disclosures of which are incorporated herein by reference.

Referring now to FIG. 9, the axial end 41 of the cable spool 37 further defines a slack storage area 59. The slack storage area 59 includes a cable management structure 61 disposed on the axial end 41 of the cable spool 37. The cable management structure 61 is sized such that an outer radius thereof is larger than the minimum bend radius of the optical fibers so as to avoid attenuation damage to the optical fibers during storage.

The cable management structure 61 and the axial end 41 of the cable spool 37 cooperatively define a cable passage 63 that extends axially through the cable management structure 61 and through the axial end 41 of the cable spool 37. The cable passage 63 allows connectorized ends of incoming optical fibers to pass from the spooling portion 39 of the cable spool 37 to the slack storage area 59. The connectorized ends of the incoming optical fibers are then routed from the slack storage area 59 to the front sides of the adapters 401 in the termination area.

Still referring to FIG. 9, the housing 23 further includes a bearing mount, generally designated 71. In the subject embodiment, the bearing mount 71 is disposed on the base 27 of the housing 23. An outer surface 73 of the bearing mount 71 is adapted for mounting or forming a bearing. In the subject embodiment, the bearing is a needle bearing. However, it will be understood that the scope of the present disclosure is not limited to the bearing being a needle bearing as the bearing could also include a bushing, low-friction coating, etc.

In one embodiment, the bearing is engaged with an inner diameter of a central hole of the cable spool 37. In another embodiment, a rotary plain bearing is formed between the outer surface 73 of the bearing mount 71 and the inner diameter of the central hole of the cable spool 37. In this embodiment, the outer diameter of the bearing mount 71 is sized to fit within an inner diameter of a central hole of the spooling portion 39. The engagement of the bearing mount 71 and the spooling portion 39 of the cable spool 37 allows the cable spool 37 to rotate about the central axis of the bearing mount 71. The bearing allows the cable spool 37 to rotate relative to the housing 23. Because the termination module 45 is mounted on the cable spool 37, the cable spool 37 carries the termination module 45 as the spool is rotated. Thus, the cable spool 37 and the termination module 45 can rotate in unison relative to the housing 23.

Referring now to FIGS. 1 and 9, the subscriber cable 22, which may include multiple optical fibers, is coiled around the spooling portion 39 of the cable spool 37. In order to protect the subscriber cable 22 from attenuation resulting from the coiling of the subscriber cable 22 around the spooling portion 39, the cable spool 37 has an outer circumferential surface having a radius that is greater than the minimum bend radius of the subscriber cable 22. The subscriber cable 22 may include a first end 5 that defines a plurality of connectorized optical fibers, which are inserted through the cable passage 63 and connectedly engaged with the first ends 3 of the adapters 401. A second end 7 of the subscriber cable 22 is configured for connectivity with the fiber distribution hub 17. However, as shown in FIG. 1, the length of subscriber cable 22 needed between each of the fiber optic enclosures 21 in the facility 13 and the fiber distribution hub 17 will vary depending upon the location of each fiber optic enclosure 21 with respect to the fiber distribution hub 17.

Now referring to FIG. 9, within the interior of the housing 23, one or more connectorized ends 5 of the subscriber cable 22 may be plugged into the first ends 3 of the adapters 401 fixedly connected to the spool 37. Accordingly, the connectorized ends 5 rotate in unison with the cable spool 37 when the cable spool 37 is rotated relative to the housing 23. The housing 23 is closed to protect the adapters 401, subscriber cable 22, and/or connectorized ends 5. For example, the top 25 may be moved to a closed position. In certain implementations, the top 25 may be locked or otherwise held in the closed position.

As noted above and as shown in FIGS. 2-7, the covering 100 into which is inserted the fiber optic enclosure 21 includes a cable management recess 102 (e.g., storage channel) at which additional length of subscriber cable 22 from the enclosure 21 may be stored. The covering 100 defines an axial throughhole 104, generally along the central longitudinal axis A of the covering 100. The throughhole 104 is configured such that a mandrel can be inserted therethrough to facilitate rotation of the covering 100 during deployment of subscriber cabling. The covering 100 includes a first inner cavity 106 (i.e., or pocket) configured to receive a fiber optic enclosure 21 therein, the first cavity 106 extending from a first axial end 108 of the covering 100. According to the depicted embodiment, the covering 100 also defines a second inner cavity 110 configured to receive another fiber optic enclosure 21 therein, the second cavity 110 extending from a second axial end 112 of the covering 100. The first and second inner cavities 106, 110 are located on opposing sides of the throughhole 104 so as to not interfere with the use of the throughhole 104 in rotating the covering 100. The placement of the first and second inner cavities 106, 110 on opposite sides of the throughhole 104 also helps with the weight distribution within the covering 100 when the covering 100 is being rotated for wrapping or deployment of cabling 22.

Each of the inner cavities 106, 110 may be closed off by a lid 114. The lid 114 may be a removable piece or may be connected to the covering 100 with a pivotable hinge structure such as a living hinge. With the lid 114 closed, the covering 100 is configured to surround (e.g., encase) the housing 23 when the housing 23 is disposed within the covering 100. In some implementations, the covering 100 is made of a protective and/or shock absorbing material, such as foam, rubber, or a variety of other types of corrugated materials. It is understood by a person of skill in the art that any suitable material for protecting the housing 23 containing the cable distribution system 8 may be utilized by the present disclosure. It should also be noted that depending upon the purposes served, different portions of the covering 100 may be formed from different materials.

Figure 2:
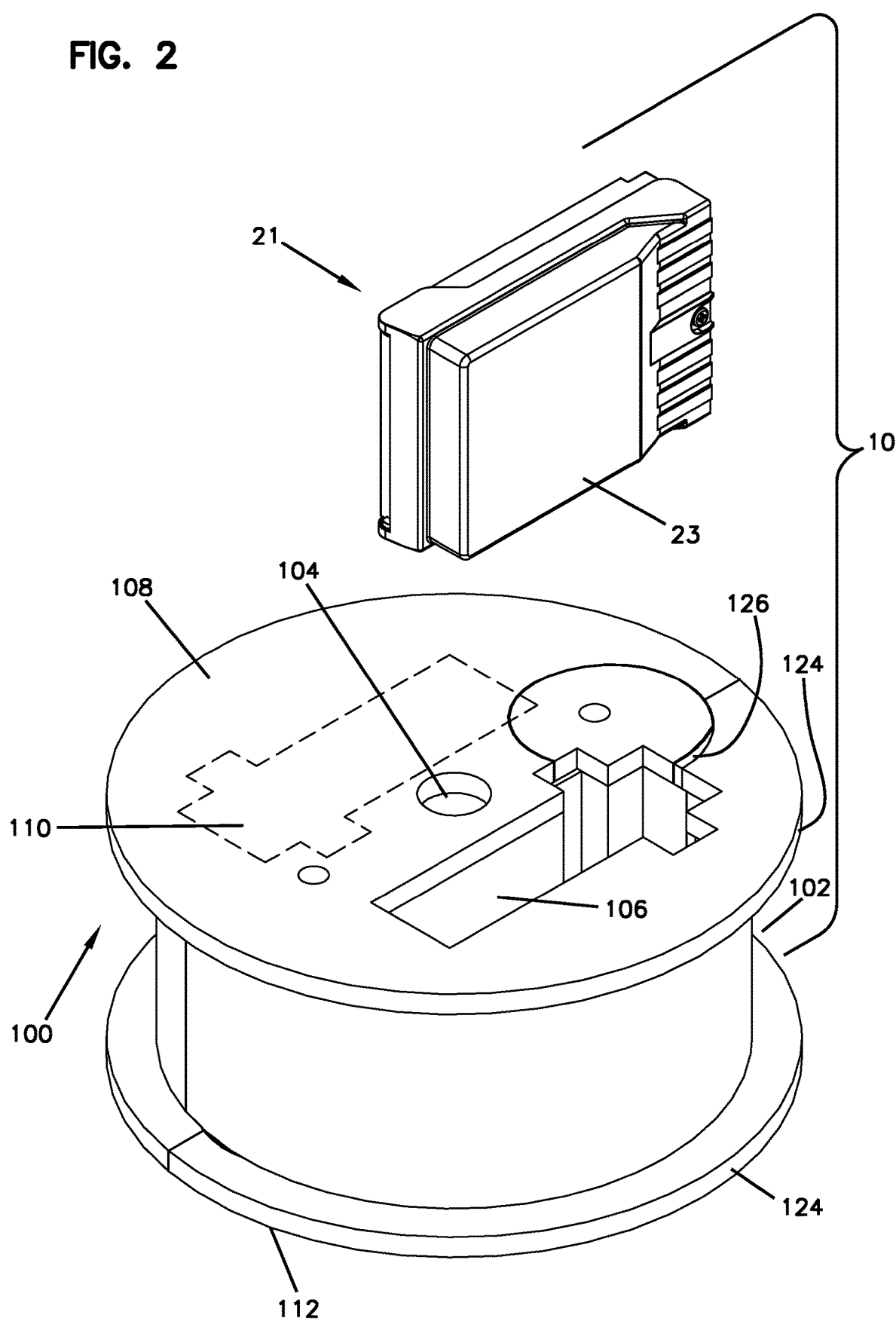
FIG. 2 is an exploded perspective view of a fiber optic enclosure assembly that includes one of the fiber optic enclosures of FIG. 1 and a covering into which the fiber optic enclosure is inserted, the fiber optic enclosure assembly having features that are examples of inventive aspects in accordance with the principles of the present disclosure.
Figure 3:
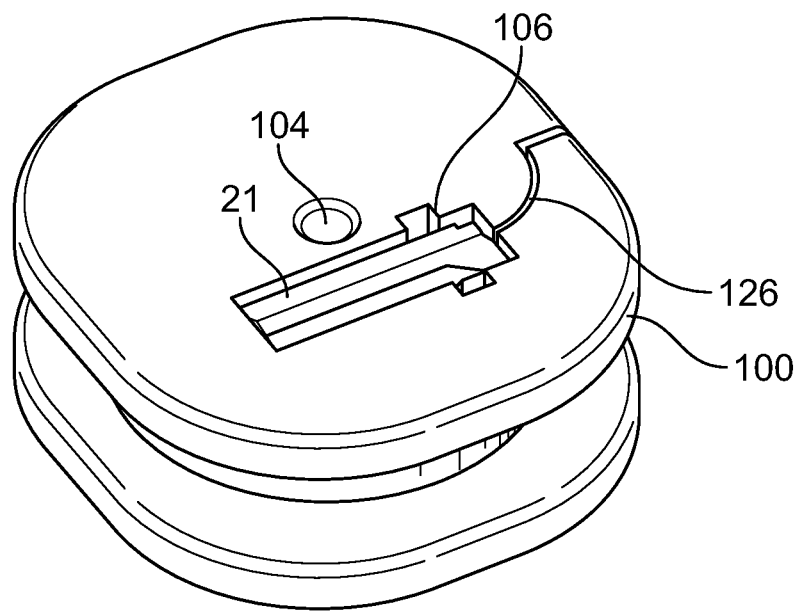
FIG. 3 is a top perspective view of the fiber optic enclosure assembly of FIG. 2, with one of the fiber optic enclosures of FIG. 1 placed within the covering.
Figure 4:
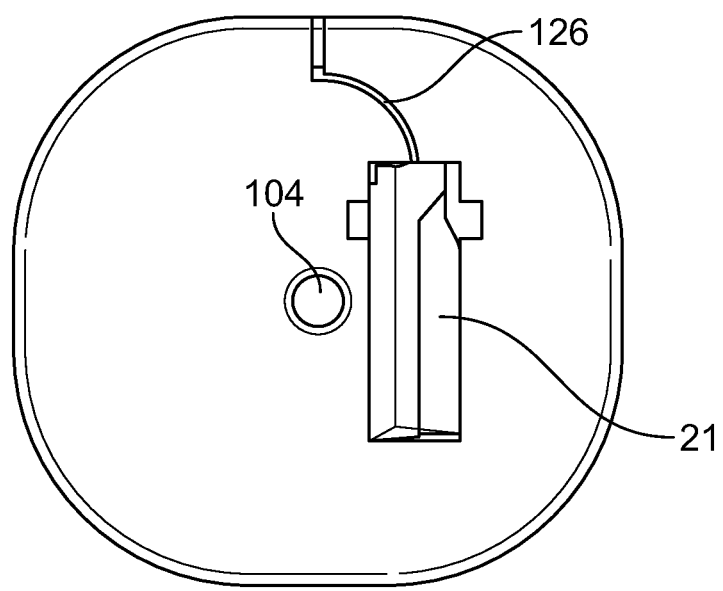
FIG. 4 is a top view of the fiber optic enclosure assembly of FIG. 3.
Figure 5:
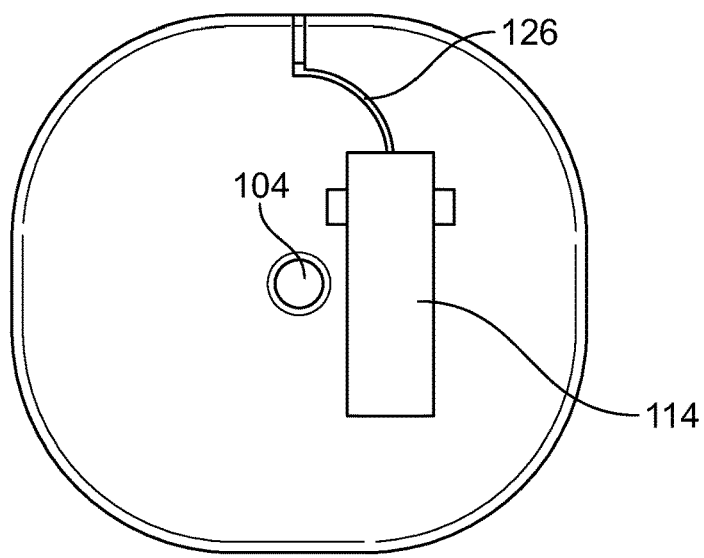
FIG. 5 illustrates the fiber optic enclosure assembly of FIG. 4 with the inner cavity of the covering closed by a lid.
Figure 6:
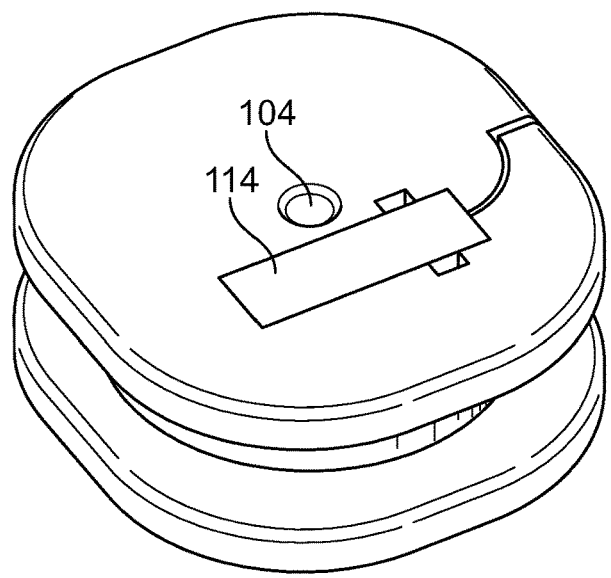
FIG. 6 illustrates a top perspective view of the fiber optic enclosure assembly of FIG. 5.
Figure 7:
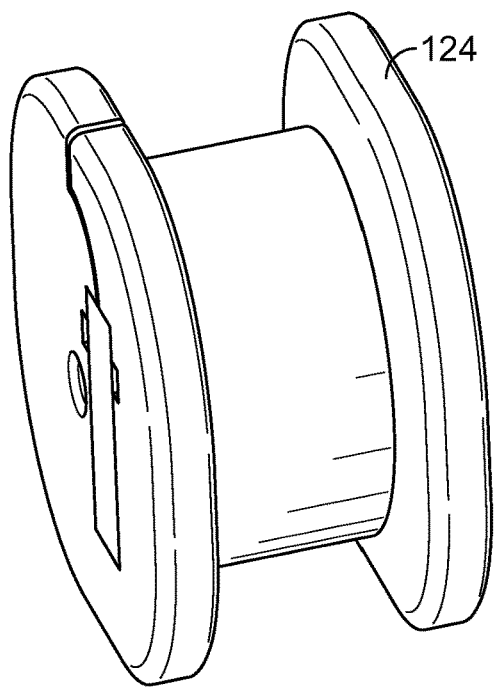
FIG. 7 illustrates the fiber optic enclosure assembly of FIG. 6 with additional plastic wrapping around the cable surrounding the covering.
Figure 10:
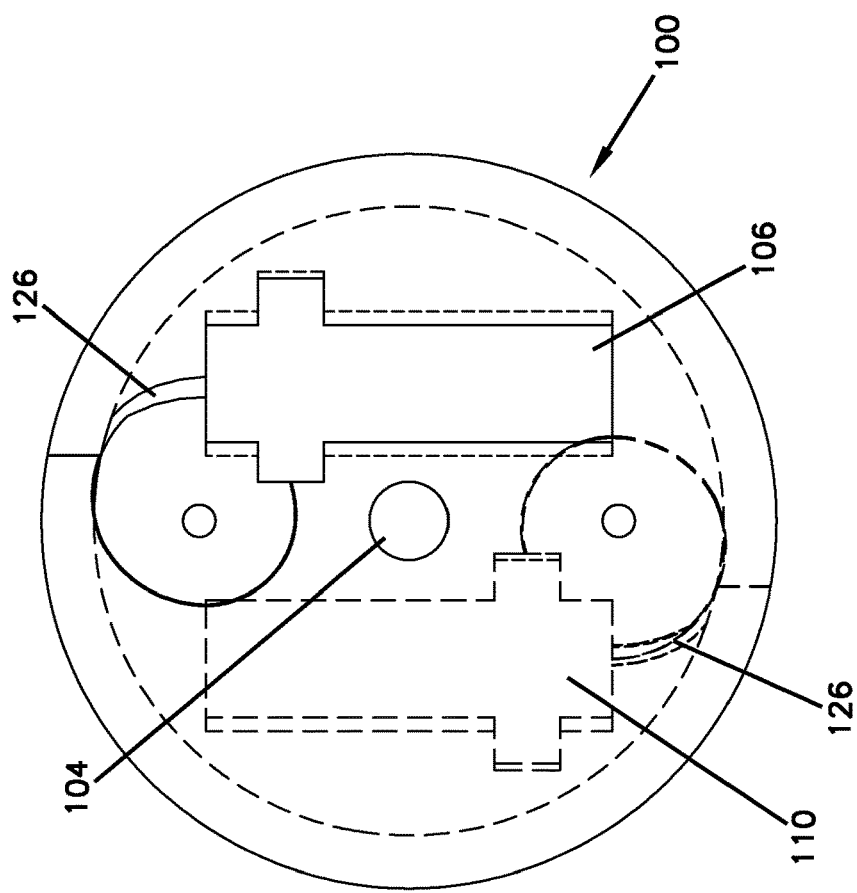
FIG. 10 is a top view of the covering into which the fiber optic enclosure of FIGS. 8-9 is inserted to form the fiber optic enclosure assembly of FIG. 2.

In certain embodiments, as shown in FIGS. 2, 10, and 14, if the portions of the covering 100 are formed from materials such as foam, foam plugs 111 may be used on certain parts of the covering that are cut out to define, for example, the slits forming the cover ports 126. As shown in FIGS. 2, 10, and 14, such foam plugs may be cut to define the outer edges of the inner cavities 106, 110. The cable management recess 102 of the covering may be located on or at any suitable side or section of the covering 100 for holding and/or retaining the subscriber cable 22 on the covering 100. In the depicted embodiment, the cable management recess 102 is disposed on an exterior surface 116 of the covering 100 as illustrated in FIGS. 2 and 7 (e.g., extends about a perimeter of the covering 100). In the depicted embodiment, the cable management recess 102 is defined by a bottom wall 118 and two opposing sidewalls 120, 122 that create flanges 124 extending radially outwardly from the bottom wall 118. A core portion of the covering 100 is shown without any flanges in FIGS. 12 and 13. A portion of the covering 100 that forms one of the flanges is shown in FIGS. 14 and 15 separated from the core.

The covering 100 defines a cover port 126 that extends from each inner cavity 106, 110 to the cable management recess 102 defined on the exterior 116 of the covering 100 (see FIGS. 10-15). In this manner, subscriber cable 22 can extend from the fiber optic enclosure 21 to the cable management recess 102 through the cover port 126 from each inner cavity 106, 110. The cover port 126 for each inner cavity 106, 110 on the covering 100 is configured to align with the housing port 26 when the housing 23 is disposed within the inner cavity. The alignment of the cover port 126 and the housing port 26 are configured to create an aperture that allows the cable 22 to pass from the interior 33 of the housing 23 to the cable management recess 102 of the covering 100. In some embodiments, the cover port 126 is a slit defined through the bottom wall surface 118 of the cable management recess 102 (see FIGS. 11 and 13 in particular).

The slit defining the cover port 126 preferably extends all the way to at least one of the axial ends 108, 112 of the covering 100 (including through the portions of the covering that forms that flanges) such that a fiber optic enclosure 21 placed within the covering 100 can be removed from the covering 100, sliding the cabling 22 through the slit 126.

If two fiber optic enclosures 21 are provided within the covering 100, the cover ports 126 may be located on opposing sides of the covering 100 as shown in FIGS. 10 and 12. In such an embodiment, one of the cover ports 126 could extend all the way to the first axial end 108 of the covering 100 and the other cover port 126 could extend all the way to the second axial 112 end of the covering 100.

Also, if two fiber optic enclosures 21 are provided within the covering 100, a portion of the cable management recess 102 (e.g., approximately half of the surface area of the bottom surface 118 of the recess 102 extending in a direction between flanges 124) may be used for spooling cabling 22 from one of the fiber optic enclosures 21 and the other half of the surface area of the bottom surface 118 of the cable management recess 102 (e.g., the half extending in a direction between flanges 124) may be used for spooling cabling from the other of the fiber optic enclosures 21. As noted above, according to certain embodiments, the cover ports 126 could be configured such that they only extend from the inner cavities 106, 110 to their respective half of the bottom surface 118 of the recess 102 that will be used to spool cable 22 from the given fiber optic enclosure 21.

The cable management recess 102 of the covering includes a cable storage portion 103 around which the fiber optic cable 22 may be wrapped (e.g., a circular pocket 103 defined in a major side of the covering 20 in which the stored cable is coiled) for holding the extra length of cable 22 within the center of the cable management recess 102. This cable storage portion 102 allows the cable management recess 102 to store a predetermined length or less of the fiber optic cable 22 on the covering 100. The cable storage portion 103 is sized such that it includes a curvature that is larger than the minimum bend radius of the optical fibers so as to avoid attenuation damage to the optical fibers during storage. Thus, even though the cable storage portion 103 and the flanges 124 have been depicted as including generally cylindrical shapes, other shapes can be used as long as the minimum bend radius requirements for the optical fibers are met. The shapes of the flanges 124 do not depend upon bend radius requirements. However, the flanges 124 should extend from the bottom wall 118 to the extent so as to be able to wind up the required amount of cabling 22.

Once an end 7 of the subscriber cable 22 has been passed through the cover port 126, this end 7 is exposed to the cable management recess 102. The end 7 of the subscriber cable 22 is preferably accessible to the user or installer of the fiber optic enclosure 21 without removing the housing 23 from the covering 100. In some embodiments, the accessible end 7 of the fiber optic cable 22 is preferably accessible by the user or operator without having to open up the top 25 of the housing 23.

As shown in FIG. 9, the end 7 of the subscriber cable 22 may be a connectorized end.

According to the present disclosure, the term "predetermined length of fiber optic cable" that is stored on the covering 100 may mean an installation length, which is sufficiently long enough to extend from the mounting location of the fiber optic enclosure 21 to the fiber distribution hub 17 (FIG. 1). In some embodiments, the predetermined length of fiber optic cable 22 is only a portion of the installation length, wherein further cabling 22 from the cable spool 37 within the enclosure 21 may be needed for the installation. In other embodiments, the length of the cable 22 that remains after the predetermined length has been deployed from the covering 100 and further cabling has been deployed from the spool 37 of the enclosure 21 may be referred to as an excess length. Thus excess length is the length of subscriber cable 22 remaining on the cable spool 37 after the installation length has been unwound from both the cable management recess 102 of the covering 100 and the spool 37 of the enclosure 21.

In one embodiment, the predetermined length around the covering 100 is greater than or equal to about 20 feet. In another embodiment, the predetermined length of subscriber cable 22 is greater than or equal to about 50 feet. In another embodiment, the predetermined length of subscriber cable 22 is greater than or equal to about 80 feet. In a further embodiment, the predetermined length of subscriber cable 22 is greater than or equal to about 100 feet. In an additional embodiment, the predetermined length of subscriber cable 22 is greater than or equal to about 150 feet. In certain embodiments, the length is in the range of 20-500 feet. According to certain embodiments, the length is about 230 feet.

According to certain embodiments, the covering 100 may include a retention device. The retention device may selectively attach the fiber optic cable or subscriber cable 22 and/or the end 7 (such as a connectorized end) of the fiber optic cable 22 to the covering 100. Non-limiting examples of the retention device include a hook, snap, clip, strap, band or any other suitable device for selectively attaching the fiber optic cable 22 to the covering 100. For example, the retention device may attach the fiber optic cable 22 to the covering during storage of the fiber optic cable 22. A user opens, unfastens, unhinges, and/or unhooks the retention device to allow the fiber optic cable 22 to be unwound from the covering 100 prior to deploying/paying out the fiber optic cable 22.

In some embodiments, the covering 100 or portions thereof may be surrounded with plastic wrap. The plastic wrap may further protect and insulate the housing 23, the cable distribution system 8, and the excess length of subscriber cable 22. The plastic wrap also may help to maintain the fiber optic cable 22 within the cable management recess 102. In some embodiments, the plastic wrap is removed or unwrapped prior to use (e.g., deployment or pay out) of the subscriber cable 22.

The fiber optic enclosure assembly 10 provides dual functionality by serving as a storage location for the fiber optic enclosure(s) 21 and the additional subscriber cable 22 and by selectively conveniently paying out a desired length of the subscriber cable 22.

One example method of storing a subscriber cable 22 in a fiber optic enclosure assembly 10 includes coiling a length of the subscriber cable 22 around the cable spool 37 disposed within the housing 23. That length of the subscriber cable 22 around the spool 37 may include a first length of subscriber cable 22. The first length of subscriber cable 22 around the spool 37 may include a portion of the installation length (i.e., the length of cable 22 that extends between the housing 23 and the FDH 17). In certain implementations, as noted above, the length of the cable 22 around the spool 37 may also include a second or an excess length, which is the length of subscriber cable 22 remaining on the cable spool 37 after the installation length has been paid out. In one embodiment, the second length, or the excess length, of subscriber cable 22 is stored around the cable spool 37 after the first length of subscriber cable 22 has been paid out. If the length of subscriber cable 22 around the spool 37 plus the predetermined length of cable 22 around the covering is greater than the installation length of subscriber cable 22, the second length, or excess length, remains stored around the cable spool 37 after installation.

In one embodiment, the length of subscriber cable 22, which is coiled around the cable spool 37, is about 70 feet, when the predetermined length of cable around the covering 100 is about 230 feet. This total of about 300 feet may be provided for each of the enclosures 21 that are inserted into a single covering 100, wherein each half of the recess 102 of the covering 100 that corresponds to each enclosure 21 could hold about 230 feet of cabling.

One example method of paying out the subscriber cable 22 from the fiber optic enclosure assembly 10 will now be described. The example method accounts for the varying lengths of subscriber cable 22 needed between the fiber optic enclosure 21 and the fiber distribution hub 17. It is understood by a person of skill in the art that other methods for selective payout of the subscriber cable 22 may be utilized with the present disclosure.

A predetermined length of the fiber optic cable 22 is stored in the cable management recess 102 of the covering 100. This predetermined length is unwound from the recess 102 (e.g., by accessing the end 7 of the fiber optic cable 22) prior to paying out the fiber optic cable 22 from the housing 23. In some implementations, the cable 22 is unwound from the exterior surface 116 of the covering 100. In some embodiments, if plastic wrap is on the covering 100, the plastic wrap is removed before accessing the recess 102. The throughhole 104 of the covering 100 may be used to insert a mandrel in turning the covering 100 for unwinding the cabling 22.

Once the predetermined length of the fiber optic cable 22 is unwound from the covering 100, the housing 23 may be removed from the covering 100. The lid 114 may be pivotally opened or removed and the inner cavity 106 or 110 accessed to remove the housing 23. The housing 23 may then mounted to a wall or other surface at a desired deployment location (e.g., on a floor of an MDU).

A user, if needing more cabling, may unwind the subscriber cable 22 from the spool 37 within the housing 23. The spool 37 rotates on the bearing mount 71 within the housing 23 when the user pulls on the cable 22. Since the adapters 401 are fixedly mounted to the cable spool 37, the adapters 401 rotate with the cable spool 37 as the cable 22 is being paid out. Accordingly, the connectorized ends 5 of the subscriber cable 22 that are plugged into the adapters 401 rotate with the cable spool 37. Thereby, the subscriber cable 22 may be deployed without the first end 5 of the subscriber cable 22 being disconnected from the termination module 45. The free end 7 of the subscriber cable 22 is routed to the FDH 17 or other optical signal source at which the free end 7 is connected to an optical network.

Once the desired length of subscriber cable 22 has been paid out, the rotation of the cable spool 37 is ceased. At this point, the position of the cable spool 37 can be fixed such that it does not rotate relative to the housing 23. In one embodiment, a pin may be inserted through an opening in the axial end 41 of the cable spool 37 and through a corresponding opening in the base 27 of the housing 23 to fix the position of the cable spool 37 with respect to the housing 23. It will be understood, however, that the scope of the present disclosure is not limited to the use of a pin to fix the position of the cable spool 37 with respect to housing 23 and other methods can be utilized.

Subsequent to paying out the subscriber cable 22, one or more additional optical fibers (e.g., distribution cable fibers) may be routed to the housing 23 for connection to the subscriber cable 22, thereby connecting the additional optical fibers to the optical network. To connect a distribution fiber to the optical network, a user accesses the interior of the housing 23 (e.g., by opening the top 25 of the housing 23). The user plugs a connectorized end of the distribution fiber into the second end 1 of one of the adapters 401 to optically couple the distribution fiber to the subscriber cable 22. The subscriber cable 22 optically couples the distribution fiber to the optical network (via a feeder cable 15).

An alternate method of selectively paying-out subscriber cable 22 from the fiber optic enclosure assembly 10 will now be described. With the fiber optic enclosure assembly 10 positioned near the fiber distribution hub 17, the second connectorized end 7 of the subscriber cable is optically connected to the fiber distribution hub 17 first. With the second end 7 of the subscriber cable 22 optically connected to the fiber distribution hub 17 and the first end 5 of the subscriber cable 22 connected to the termination module 45 (within the enclosure 21), the fiber optic enclosure assembly 10 is transported away from the fiber distribution hub 17.

In one embodiment, the fiber optic enclosure assembly 10 is carried away from the fiber distribution hub 17 by an installer, with the covering 100 rotating around a mandrel type structure. In another embodiment, the fiber optic enclosure assembly 10 is transported away from the fiber distribution hub 17 in a wheeled cart (e.g., dolly, 4-wheeled cart, etc.). In a preferred embodiment, the fiber optic enclosure 21 is disposed in a packaging enclosure (e.g., covering 100) during transport. As the fiber optic enclosure assembly 10 is transported away from the fiber distribution hub 17, the subscriber cable 22 unwinds from the cable management recess 102 of the covering 100. Once the cabling 22 around the covering 100 is all deployed, the enclosure 21 can be removed from the covering 100 and the cable 22 around the spool 37 of the housing 23 can then be deployed, with the cable spool 37 rotating within the interior region 33 of the housing 23. When the fiber optic enclosure assembly 10 has been transported to its mounting location, the fiber optic enclosure 21 is removed from the packaging covering 100 and mounted to the mounting location. The cable spool 37 can be fixed in position relative to the housing 23 to prevent inadvertent rotation of the cable spool 37.

If the given covering 100 has been used to store two fiber optic enclosures 21 and additional cabling 22 from two fiber optic enclosures 21, once subscriber cable 22 from one of the fiber optic enclosures 21 has been paid out and the fiber optic enclosure 21 removed from the covering 100, the cabling 22 from the other fiber optic enclosure 21 can be deployed in a similar manner (e.g., first from the covering 100 and then from the other enclosure 21 if needed). The second enclosure 21 can then be removed from the covering 100 and mounted to a mounting location as in the first enclosure 21. Thus, covering 100 can be used as a protective packaging for both of the fiber optic enclosures 21 and allows either or both of the enclosures 21 to be connected to the network.

It should be noted that even though the present description depicts the use of two fiber optic enclosures 21 within a single covering 100, the covering 100 can be configured to hold more or less such enclosures 21.

As noted above, placement of two enclosures 21 on opposing sides of the throughhole 104 provides weight distribution advantages for the spinning of the covering 100, both during deployment and winding of the cabling at the factory.

Also, if a single inner cavity 106/110 is being used for storing one enclosure 21, the other inner cavity 110/106 may be provided with a counterweight during the winding of the cabling 22 at the factory for weight distribution.

Although the present disclosure depicts only one example of a fiber optic enclosure 21 that can be used within the covering 100 to form the fiber optic enclosure assembly 10 of the present invention, other types or configurations of fiber optic enclosures 21 having connection locations can be utilized with the covering 100 and the invention should not be limited to the configurations of enclosures 21 shown. Preferably, the types of fiber optic enclosures 21 that may be used within the covering 100 should be ones that include a type of a cable deployment means for deployment additional cable if needed, such as a rotating spool, etc.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A fiber optic enclosure assembly comprising:
    a fiber optic component defining connection locations, the fiber optic component including an enclosure having a base and a front cover connected to the base such that the base and the front cover cooperate to enclose an interior region of the enclosure;
    a fiber optic cable extending from the connection locations of the fiber optic component;
    a spool assembly defining a first axial end including a first flange, and a second axial end including a second flange, the spool assembly including a drum that extends axially between the first and second flanges, the first and second flanges each defining an outer annular rim that projects radially outwardly from the drum; and
    a first storage compartment located within the drum, the first flange defining an opening for accessing the first storage compartment within the drum;
    wherein the fiber optic component is removably positioned within the first storage compartment; and
    wherein the fiber optic cable extending from the connection locations extends from the first storage compartment to an outer surface of the drum for coiling about the outer surface of the drum, the fiber optic cable being payable and removable from the drum.

2. The fiber optic enclosure assembly according to claim 1, wherein a cable port extends from the first storage compartment to an outer perimeter of the first flange, the cable port including an open recess defined in the first flange such that the cable port is accessible through an outer surface of the first flange.

3. The fiber optic enclosure assembly according to claim 1, wherein the first and second flanges define central openings for receiving a mandrel, the central openings being aligned along a central axis of rotation of the spool assembly.

4. The fiber optic enclosure assembly according to claim 3, wherein the spool assembly defines a second storage compartment for receiving another fiber optic enclosure, the first and second storage compartments being located on opposite sides of the central openings.

5. The fiber optic enclosure assembly according to claim 4, wherein the first storage compartment extends at least partially from the first axial end of the spool assembly and the second storage compartment extends at least partially from the second axial end of the spool assembly.

6. The fiber optic enclosure assembly according to claim 1, wherein the fiber optic cable extending from the connection locations of the fiber optic component defines a connectorized end connected to fiber optic adapters.

7. The fiber optic enclosure assembly according to claim 6, wherein the connection locations are defined by the fiber optic adapters.

8. The fiber optic enclosure assembly according to claim 1, wherein the enclosure defines a rotatable spool, the rotatable spool being configured to store at least a portion of the fiber optic cable extending from the connection locations to the outer surface of the drum.

9. The fiber optic enclosure assembly according to claim 8, wherein the rotatable spool is located within an interior of a housing of the enclosure, the housing further defining a cover closing off the interior.

10. The fiber optic enclosure assembly according to claim 1, wherein the first storage compartment is closed off by a lid.

11. The fiber optic enclosure assembly according to claim 10, wherein the lid is connected to the spool assembly by a pivotable hinge structure.

12. The method according to claim 11, wherein the pivotable hinge structure is a living hinge.

13. The method according to claim 1, wherein the first and second flanges of the spool assembly comprises a corrugated material.

* * * * *